(12) United States Patent
Yi (10) Patent No.: US 12,037,039 B2
(45) Date of Patent: *Jul. 16, 2024

(54) CHILD STROLLER APPARATUS

(71) Applicant: WONDERLAND SWITZERLAND AG, Steinhausen (CH)

(72) Inventor: Xiaolong Yi, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,982

(22) Filed: May 10, 2023

(65) Prior Publication Data

US 2023/0278615 A1 Sep. 7, 2023

Related U.S. Application Data

(63) Continuation of application No. 17/571,231, filed on Jan. 7, 2022, now Pat. No. 11,685,419.

(30) Foreign Application Priority Data

Jan. 8, 2021 (CN) .......................... 202110024013.2

(51) Int. Cl.
*B62B 9/10* (2006.01)
*B62B 7/04* (2006.01)

(52) U.S. Cl.
CPC . *B62B 9/10* (2013.01); *B62B 7/04* (2013.01)

(58) Field of Classification Search
CPC .. B62B 9/10; B62B 9/102; B62B 9/12; B62B 7/04; B62B 7/06; B62B 7/14; B62B 7/142; B62B 7/145
See application file for complete search history.

(56) References Cited

U.S. PATENT DOCUMENTS

| | | | |
|---|---|---|---|
| 9,108,659 B2 * | 8/2015 | Sparling | ................. B62B 7/142 |
| 10,442,453 B2 * | 10/2019 | Haut | ...................... B62B 7/062 |
| 2015/0042056 A1 | 2/2015 | Sparling | |

FOREIGN PATENT DOCUMENTS

| | | | | |
|---|---|---|---|---|
| CN | 108791451 A | | 11/2018 | |
| CN | 208439297 U | | 1/2019 | |
| DE | 102013005495 B4 | | 10/2013 | |
| DE | 202019104950 U1 | | 9/2019 | |
| DE | 202019104950 U1 * | | 10/2019 | ............. B62B 7/008 |
| DE | 102013005495 B4 * | | 5/2022 | ........... B62B 5/0013 |
| WO | 2015109103 A1 | | 7/2015 | |

OTHER PUBLICATIONS

Taiwanese Office Action issued in corresponding Taiwanese Patent Application No. 111100617, dated Sep. 2, 2022, pp. 1-6.

* cited by examiner

*Primary Examiner* — John D Walters
(74) *Attorney, Agent, or Firm* — HAUPTMAN HAM, LLP (57) ABSTRACT

A child stroller apparatus includes a stroller frame, and a mounting system including a first coupling part provided on the stroller frame, and an adapter suitable to receive the installation of a detachable component. The adapter is installable on and detachable from the first coupling portion, wherein the adapter includes a support body having a second coupling portion and a third coupling portion, the second coupling portion being detachably connectible with the first coupling portion, and the third coupling portion being detachably connectible with the detachable component.

20 Claims, 8 Drawing Sheets

CHILD STROLLER APPARATUS

CROSS-REFERENCE TO RELATED APPLICATION(S)

This application is a continuation application of U.S. patent application Ser. No. 17/571,231 filed on Jan. 7, 2022, which claims priority to China patent application no. 202110024013.2 filed on Jan. 8, 2021.

BACKGROUND

1. Technical Field

The present application relates to child stroller apparatuses.

2. Description of the Related Art

Caregivers typically use child stroller apparatuses to transport babies and children. A child stroller apparatus generally includes a metallic frame comprised of metallic and plastic parts assembled together, and a fabric connected with or covering the metallic frame. When it is not used, the child stroller apparatus can be folded for facilitating storage and transport.

Some existing child stroller apparatuses may have a mounting system adapted to receive the installation of different child supporting parts, such as child seats or child bassinets, which can provide more flexibility in use. However, the operation of the mounting system provided therein may arise safety concerns.

SUMMARY

The present application describes a child stroller apparatus including a mounting system capable of accommodating different detachable components, such as child seats and bassinets.

According to one aspect, the child stroller apparatus includes a stroller frame, and a mounting system including a first coupling part provided on the stroller frame, and an adapter suitable to receive the installation of a detachable component. The adapter is installable on and detachable from the first coupling portion, wherein the adapter includes a support body having a second coupling portion and a third coupling portion, the second coupling portion being detachably connectible with the first coupling portion, and the third coupling portion being detachably connectible with the detachable component.

DETAILED DESCRIPTION OF THE EMBODIMENTS

Figure 1:
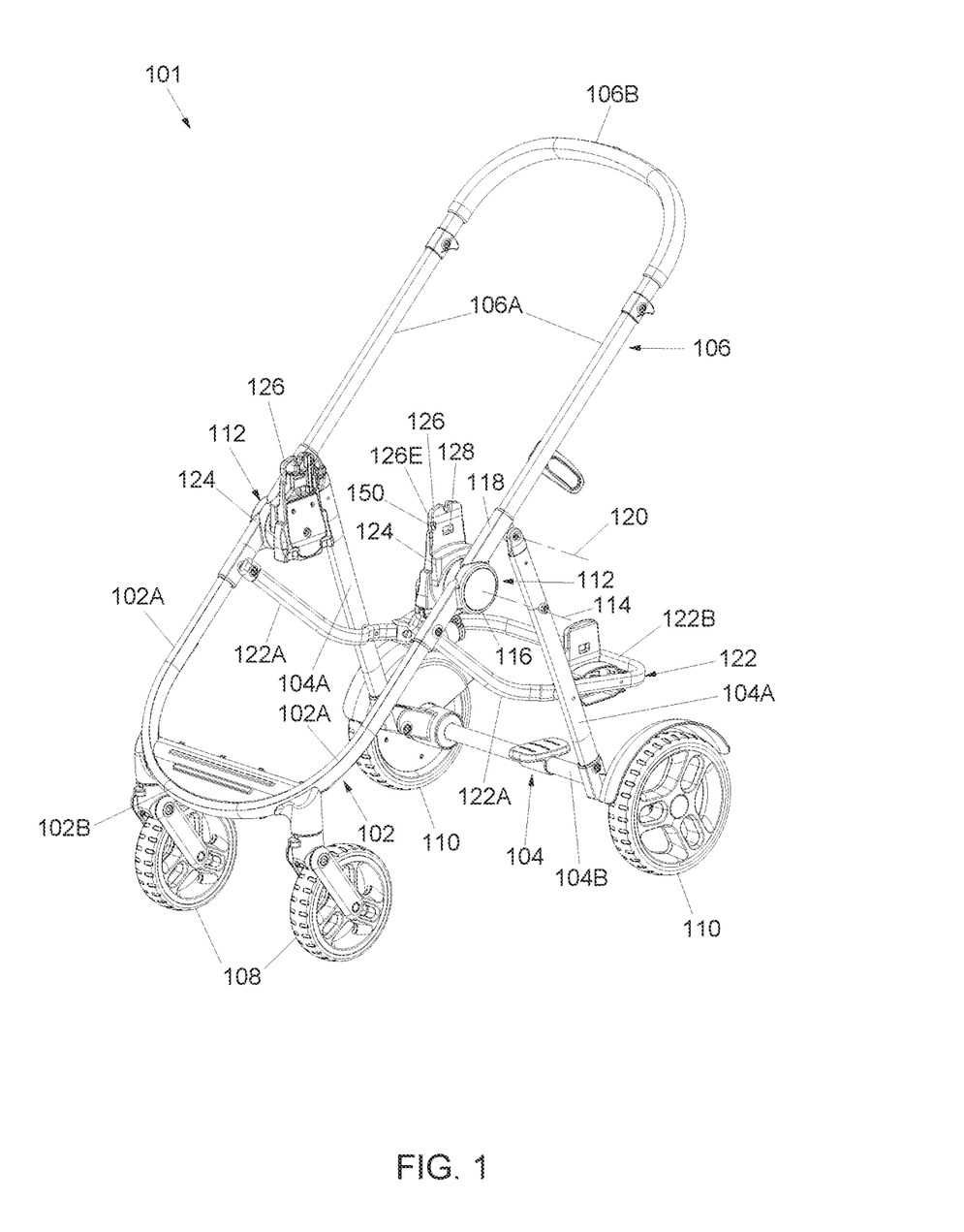
FIG. 1 is a perspective view illustrating an embodiment of a child stroller apparatus.

FIG. 1 is a perspective view illustrating an embodiment of a child stroller apparatus 100. Referring to FIG. 1, the child stroller apparatus 100 can include a stroller frame 101. The stroller frame 101 includes a front leg frame 102, a rear leg frame 104 and a handle frame 106.

According to an example of construction, the front leg frame 102, the rear leg frame 104 and the handle frame 106 may be formed by tubular structures. The front leg frame 102 can have two side segments 102A respectively disposed at a left side and a right side of the child stroller apparatus 100, and a transversal portion 102B connected with the two side segments 102A. A lower portion of the front leg frame 102 can be provided with a plurality of wheel assemblies 108. The rear leg frame 104 can have two side segments 104A respectively disposed at the left side and right side of the child stroller apparatus 100, and a transversal segment 104B connected with the two side segments 104A. A lower portion of the rear leg frame 104 can be provided with a plurality of wheel assemblies 110. The handle frame 106 can have two side segments 106A respectively disposed at the left side and right side of the child stroller apparatus 100, and a transversal segment 106B connected with the two side segments 106A.

A similar structure assembly may be applied to connect the front leg frame 102, the rear leg frame 104 and the handle frame 106 at each of the left side and right side of the child stroller apparatus 100. According to an example of construction, the front leg frame 102 and the handle frame 106 can be pivotally connected with each other via a pivot joint structure 112 at each of the left side and right side so that the handle frame 106 can rotate about a pivot axis 114 relative to the front leg frame 102. For example, the pivot joint structure 112 at each of the left side and right side can include a coupling part 116 fixedly connected with the side segment 102A of the front leg frame 102 at an upper end thereof, and a coupling part 118 fixedly connected with the side segment 106A of the handle frame 106 at a lower end thereof. The two coupling parts 116 and 118 can be pivotally connected with each other so that the front leg frame 102 is pivotally coupled to the handle frame 106. Moreover, the rear leg frame 104 can be pivotally connected with the handle frame 106 so that the handle frame 106 can rotate about a pivot axis 120 relative to the rear leg frame 104. For example, at each of the left and right side, the side segment 104A of the rear leg frame 104 can have an upper end pivotally connected with the side segment 106A of the handle frame 106 at a location above the pivot axis 114. In addition, the child stroller apparatus 100 can further include a support frame 122 having two side segments 122A and a transversal segment 122B connected with the two side segments 122A, wherein the side segment 122A is respectively connected with the side segment 102A of the front leg frame 102 and the side segment 104A of the rear leg frame 104 at each of the left and right sides. The support frame 122 including the two side segments 122A and the transversal segment 122B may be provided as a single part. With the construction described herein, the front leg frame 102, the rear leg frame 104, the handle frame 106 and the support frame 122 can be movably linked to one another for facilitating folding and unfolding of the child stroller apparatus 100.

Referring to FIG. 1, the child stroller apparatus 100 can further include a mounting system comprised of a plurality of connecting mounts 124 provided on the stroller frame 101 for installation of a detachable component as desired. According to an example of construction, two connecting mounts 124 can be respectively disposed adjacent to the two pivot joint structures 112, e.g., each connecting mount 124 can be connected with an inner side of the corresponding pivot joint structure 112. Examples of detachable components that may be installed on the connecting mounts 124 can include, without limitation, child seats, carry cots, and the like.

The two connecting mounts 124 can be similar in construction, and are adapted to engage with a detachable component that is to be installed on the stroller frame 101. According to an example of construction, the two connecting mounts 124 can be respectively connected pivotally with the stroller frame 101 so that the connecting mounts 124 can rotate relative to the stroller frame 101. For example, the two connecting mounts 124 may be respectively connected pivotally with the coupling parts 118 of the two side segments 106A at an inner side of the handle frame 106.

Each connecting mount 124 can have a coupling portion 126 adapted to receive the mount of a detachable component. According to an example of construction, the connecting mount 124 including the coupling portion 126 can be provided as a single rigid part. When the connecting mount 124 is in a use configuration, the coupling portion 126 can protrude upward for facilitating the installation of a detachable component, wherein the coupling portion 126 can have a symmetrical shape so as to be engageable with a detachable component placed in different orientations. For example, a detachable child seat may be engaged with the coupling portion 126 of the connecting mount 124 in a forward facing position or a rearward facing position. Moreover, the connecting mount 124 can have an opening 128 adapted to engage with a latch or fitting structure provided on a detachable component, which can lock the detachable component to the connecting mount 124.

Figure 2:
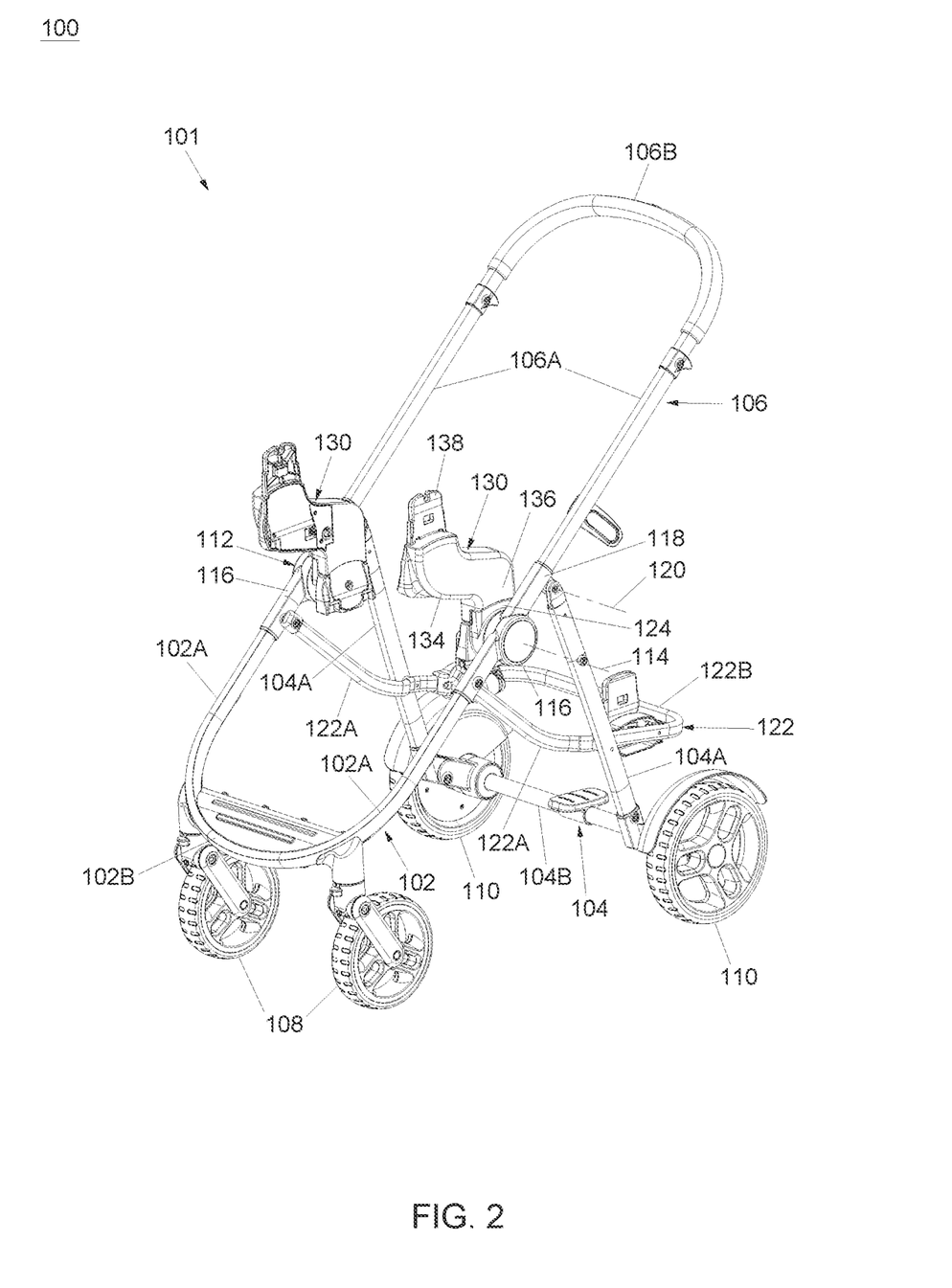
FIG. 2 is a perspective view illustrating the child stroller apparatus having adapters installed therein.
Figure 3:
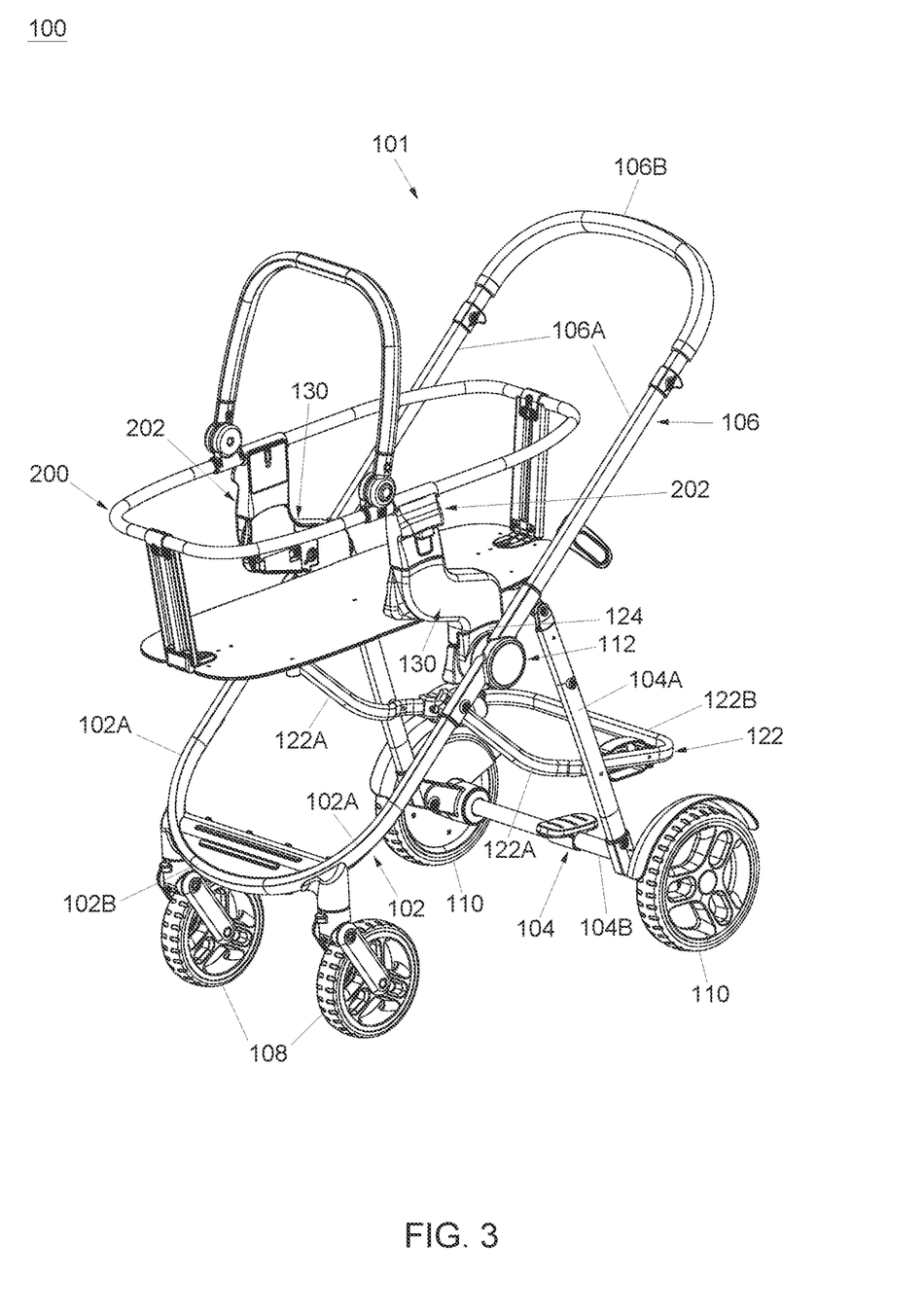
FIG. 3 is a perspective view illustrating the child stroller apparatus including a detachable component mounted on the installed adapters.

Referring to FIG. 2, the child stroller apparatus 100 further includes two adapters 130 that are respectively installable on and detachable from the coupling portions 126 of the two connecting mounts 124 and are adapted to engage with a detachable component. According to a desired use, a detachable component or the adapter 130 thus can be selectively installed one at a time on the connecting mount 124. The two adapters 130 may be similar in construction. After the adapters 130 are installed on the connecting mounts 124, a detachable component can be installed on the stroller frame 101 by engaging with the adapters 130, which allows the detachable component to be installed on the stroller frame 101 at a mount position that differs from a mount position provided by the connecting mounts 124. Examples of detachable components that may be installed on the adapters 130 can include, without limitation, child seats, carry cots, and the like. FIG. 3 illustrates an example in which the two adapters 130 are respectively installed on the two connecting mounts 124 and are engaged with a detachable component 200, wherein the detachable component 200 is exemplarily a bassinet. The detachable component 200 can have two connectors 202 respectively provided at two opposite sides thereof, which can respectively engage with the two adapters 130 when the detachable component 200 is installed on the stroller frame 101. As shown in FIG. 3, the adapters 130 may facilitate the installation of a detachable component 200 having a relatively larger size on the stroller frame 101. Moreover, the detachable component 200 mounted on the adapters 130 can be positioned higher than when the detachable component 200 is directly mounted on the connecting mounts 124 without the adapters 130, which can allow a caregiver to more easily access a child placed in the detachable component 200.

Figure 4:
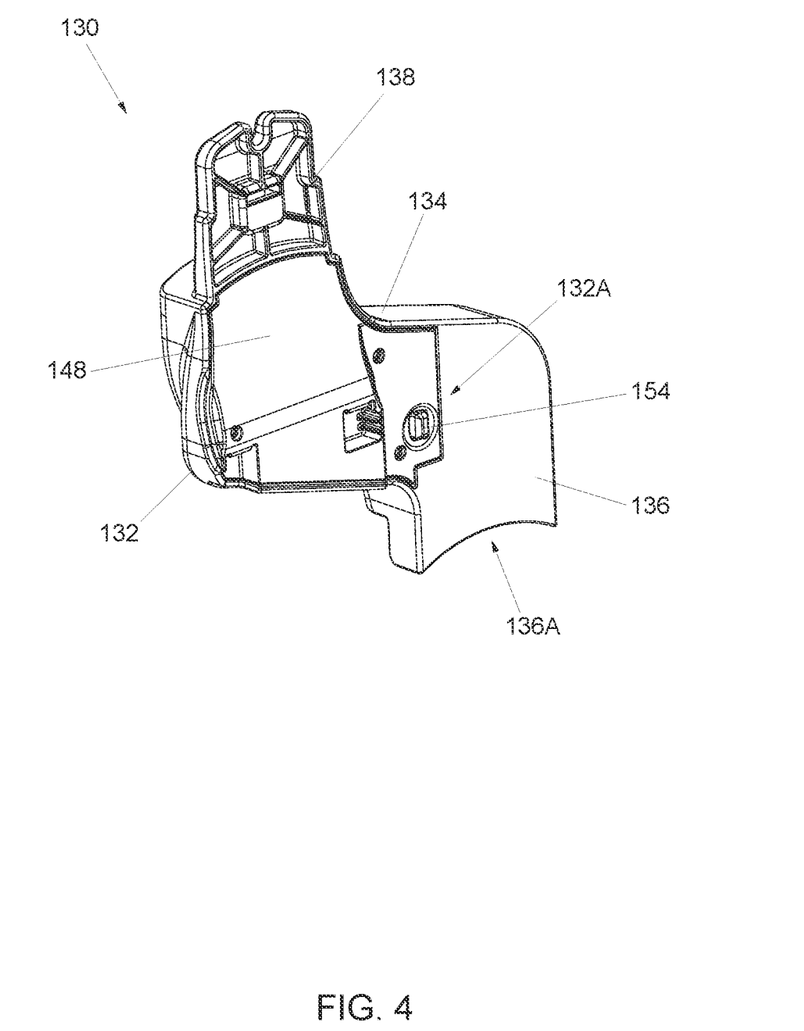
FIG. 4 is a perspective view illustrating one adapter.

In conjunction with FIGS. 1-3, FIG. 4 is a perspective view illustrating one adapter 130. Referring to FIGS. 2-4, the adapter 130 can include a support body 132 having an extending portion 134 and two coupling portions 136 and 138. The extending portion 134 may be fixedly connected with the two coupling portions 136 and 138. The two coupling portions 136 and 138 can respectively protrude from two opposite sides of the extending portion 134, the coupling portion 136 being adapted to engage with the coupling portion 126 of the connecting mount 124, the coupling portion 138 being adapted to engage with the detachable component. When the adapter 130 is installed on the connecting mount 124, the coupling portion 136 of the support body 132 can protrude downward from the extending portion 134 and engage with the coupling portion 126 of the connecting mount 124, the extending portion 134 can extend forward along a horizontal direction from the coupling portion 136 and the coupling portion 126 of the connecting mount 124, and the coupling portion 138 of the support body 132 can protrude upward from the extending portion 134 for receiving the installation of a detachable component. Accordingly, the adapter 130 can provide a mount position for a detachable component that is higher than and displaced forward from the mount position provided by the connecting mount 124. According to an example of construction, the coupling portion 136 of the support body 132 can have a receiving slot 136A adapted to receive the insertion of the coupling portion 126 of the connecting mount 124. Moreover, the coupling portion 138 of the support body 132 can have a structure similar to that of the coupling portion 126 of the connecting mount 124 and is adapted to receive the installation of a detachable component. For example, the coupling portion 138 of the support body 132 can have a structure adapted to be inserted into a receiving slot provided on the detachable component, and the detachable component can have a latch operable to engage with the coupling portion 138 for locking the detachable component to the adapter 130.

Figure 5:
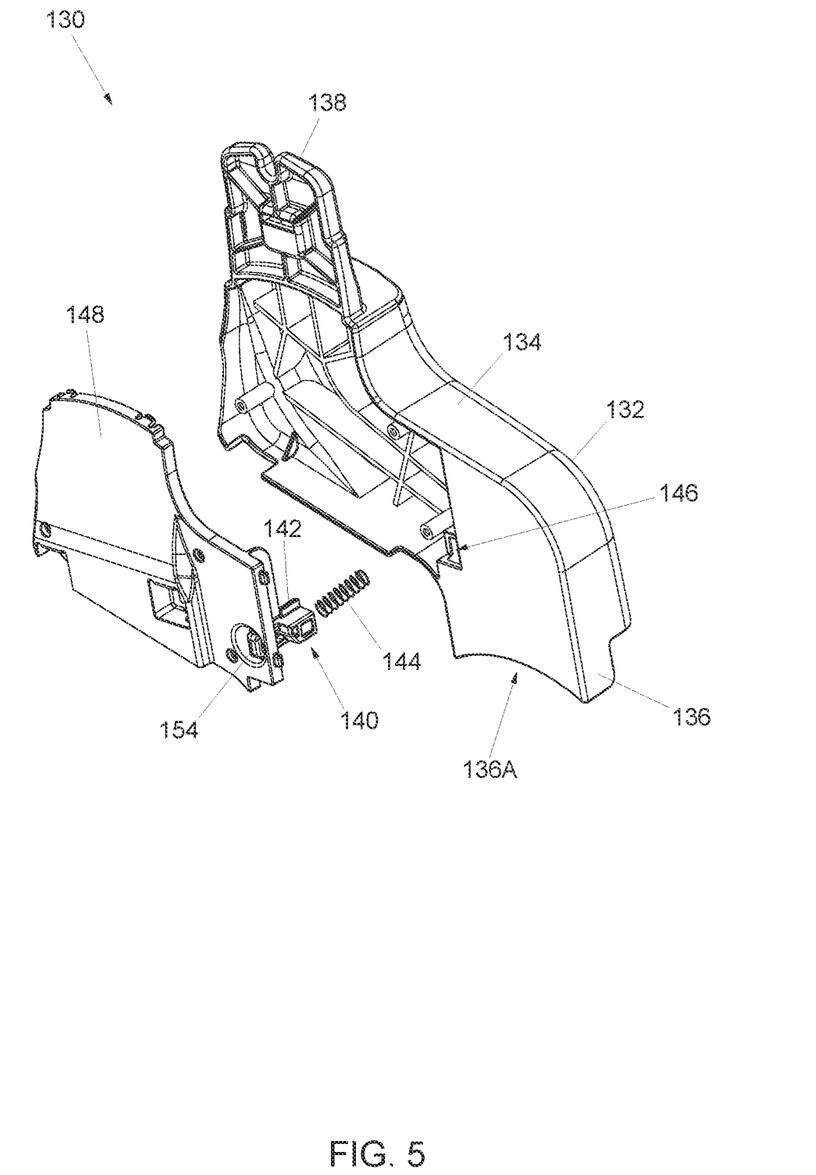
FIG. 5 is an exploded view illustrating some construction details of a locking mechanism provided in the adapter.
Figure 6:
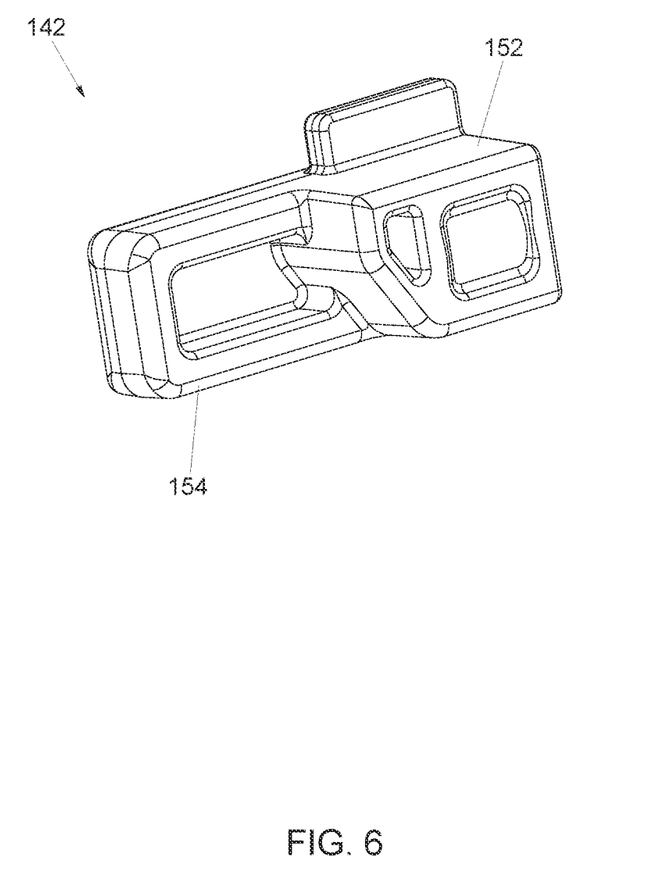
FIG. 6 is a perspective view illustrating a latch used in the locking mechanism.
Figure 7:
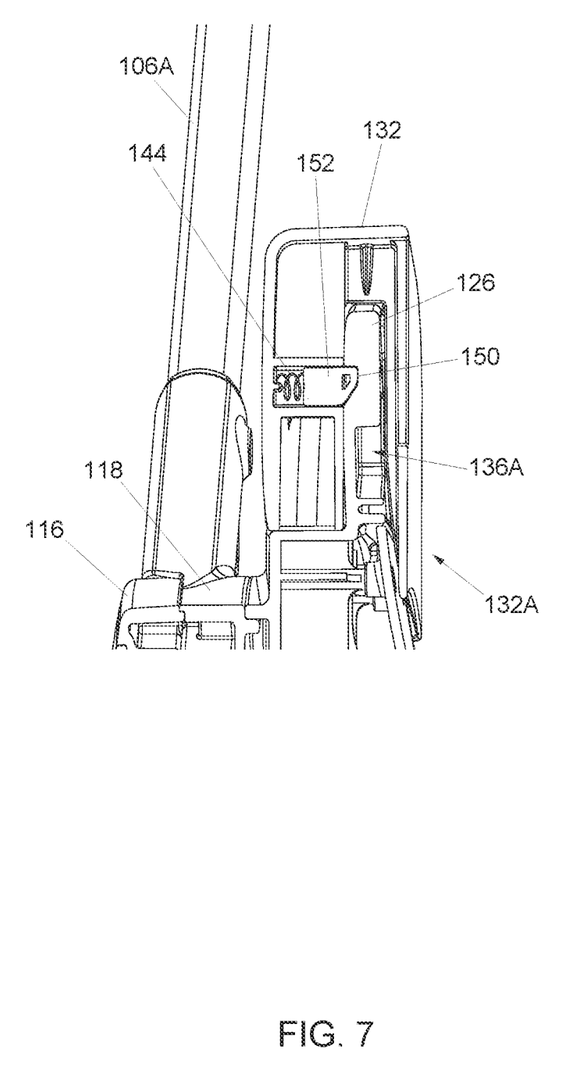
FIG. 7 is a cross-sectional view illustrating the latch of the locking mechanism in a locking state.
Figure 8:
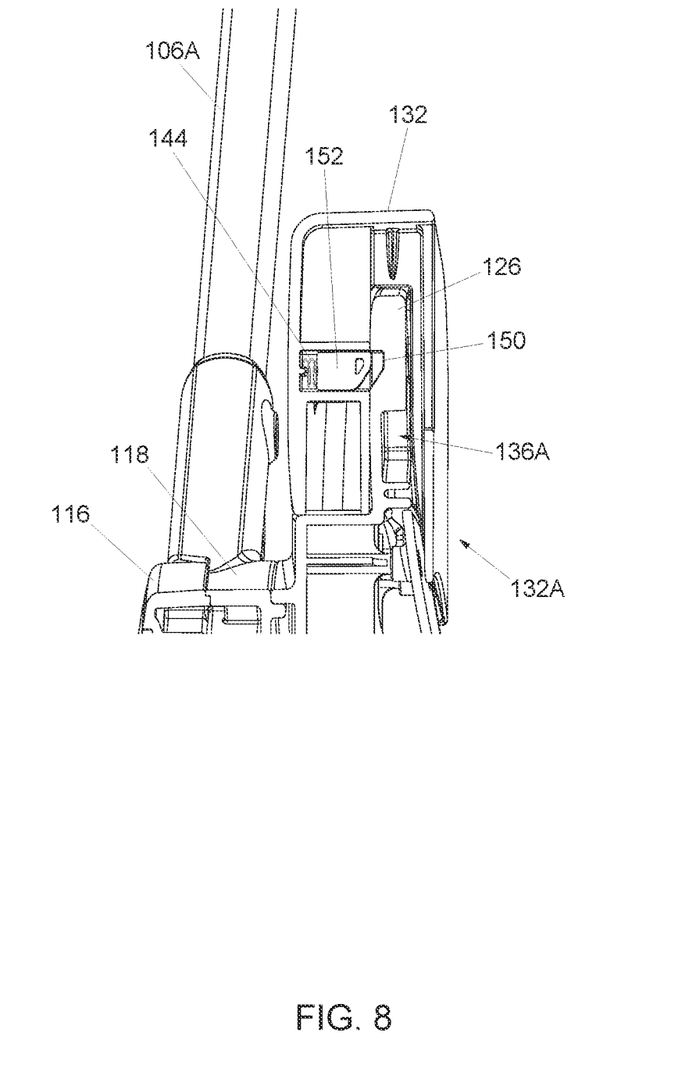
FIG. 8 is a cross-sectional view illustrating the latch of the locking mechanism in an unlocking state.

In conjunction with FIGS. 1-4, FIG. 5 is an exploded view illustrating a locking mechanism 140 provided in the adapter 130. FIG. 6 is a perspective view illustrating a latch 142 used in the locking mechanism 140. FIG. 7 is a cross-sectional view illustrating the latch 142 of the locking mechanism 140 in a locking state, and FIG. 8 is a cross-sectional view illustrating the latch 142 of the locking mechanism 140 in an unlocking state. Referring to FIGS. 1-6, the adapter 130 can further include a locking mechanism 140 operable to lock the adapter 130 to the connecting mount 124. According to an example of construction, the locking mechanism 140 can include a latch 142 and a spring 144. The support body 132 can have an inner cavity 146 that is closed with a cover 148 at one side, and the latch 142 and the spring 144 can be assembled inside the inner cavity 146. The latch 142 is movably connected with the support body 132 so that the latch 142 can move relative to the support body 132 to engage with or disengage from the coupling portion 126 of the connecting mount 124. According to an example of construction, the latch 142 is slidably connected with the support body 132 so that the latch 142 can slide transversally relative to the support body 132. Accordingly, the latch 142 can slide to engage with and disengage from the coupling portion 126 of the connecting mount 124. For example, the coupling portion 126 of the connecting mount 124 can have a recess 150 (better shown in FIG. 1), and the latch 142 can have an engaging protrusion 152 adapted to engage with the recess 150, wherein the recess 150 may be exemplarily provided on a surface of the coupling portion 126 adjacent to a side edge 126E thereof. More specifically, when the coupling portion 126 of the connecting mount 124 is inserted into the receiving slot 136A of the adapter 130, the engaging protrusion 152 can move toward the interior of the receiving slot 136A and engage with the recess 150 of the coupling portion 126 for locking the adapter 130 to the connecting mount 124.

The spring 144 can urge the latch 142 to move for engaging the engaging protrusion 152 with the coupling portion 126 of the connecting mount 124. According to an example of construction, the spring 144 can have two ends respectively connected with the latch 142 and the support body 132, wherein the spring 144 can be exemplarily a compression spring.

Referring to FIG. 4-6, the locking mechanism 140 can further include an operating part 154 connected with the latch 142 so that a caregiver can operate the operating part 154 to cause unlocking of the latch 142. According to an example of construction, the operating part 154 can be fixedly connected with the latch 142, e.g., the latch 142 and the operating part 154 may be formed integrally as a single part, whereby the latch 142 and the operating part 154 are movable in a concurrent manner. The operating part 154 can extend at a side of the engaging protrusion 152, and protrude from the cover 148 to be exposed at an inner side 132A of the support body 132 (the inner side 132A of the support body 132 faces an interior of the stroller frame 101 where a child can be placed). Accordingly, the engaging protrusion 152 and a portion of the operating part 154 exposed at the inner side 132A of the support body 132 are respectively located at two opposite sides of the receiving slot 136A. The latch 142 can slide toward the inner side 132A of the support body 132 for engaging with the coupling portion 126 of the connecting mount 124, and the operating part 154 can be operated to urge the latch 142 to slide in an opposite direction for disengaging from the coupling portion 126 of the connecting mount 124. According to an example of construction, the portion of the operating part 154 exposed at the inner side 132A of the support body 132 can be shaped as a button. Because the operating part 154 is exposed at the inner side 132A of the support body 132, a child would not easily have access to the operating part 154, which can prevent accidental unlocking of the locking mechanism 140.

Referring to FIGS. 1, 2 and 4-7, when the adapter 130 is installed on the connecting mount 124, the coupling portion 126 of the connecting mount 124 inserts into the receiving slot 136A of the adapter 130, and the latch 142 biased by the spring 144 can engage with the coupling portion 126 of the connecting mount 124. More specifically, the latch 142 can extend transversally across the side edge 126E of the coupling portion 126 to two opposite sides of the coupling portion 126 so that the engaging protrusion 152 of the latch 142 engages with the recess 150 on one surface of the coupling portion 126 and the latch 142 can extend to another opposite surface of the coupling portion 126. Accordingly, the operating part 154 of the latch 142 can be exposed on the inner side 132A of the support body 132.

Referring to FIGS. 2, 4-6 and 8, for removing the adapter 130 from the connecting mount 124, a caregiver can push the operating part 154 on the inner side 132A of the support body 132, which urges the latch 142 to move and cause the engaging protrusion 152 to disengage from the coupling portion 126 of the connecting mount 124. The adapter 130 can be thereby unlocked and removed from the connecting mount 124.

The child stroller apparatus described herein is convenient to operate, and has a mounting system adapted to receive the installation of different detachable components such as child seats, bassinets, and the like. According to the needs, the mounting system may also be connected with an adapter that can modify the mounting position of the detachable component, thereby offering more flexibility in use. Moreover, the adapter can have a locking mechanism operable to lock the adapter to a connecting mount of the mounting system, wherein an operating part for unlocking the locking mechanism is provided at an inner side of the adapter so that a child would not easily have access to the operating part. As a result, accidental unlocking of the locking mechanism can be prevented, which can offer safer use.

Realization of the child stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child stroller apparatus comprising:
   a stroller frame; and
   a mounting system including a first coupling part provided on the stroller frame, and an adapter suitable to receive the installation of a detachable component, the adapter being installable on and detachable from the first coupling portion, wherein the adapter includes a support body having a second coupling portion and a third coupling portion, the second coupling portion being detachably connectible with the first coupling portion, and the third coupling portion being detachably connectible with the detachable component.

2. The child stroller apparatus according to claim 1, wherein the first coupling portion of the stroller frame is adapted to receive a detachable component without the adapter installed on the first coupling portion.

3. The child stroller apparatus according to claim 1, wherein the mounting system provides a first mount configuration in which a detachable component is installable on the stroller frame with the adapter interposed between the first coupling portion of the stroller frame and the detachable component, and a second mount configuration in which the detachable component is installable on the first coupling portion of the stroller frame without the adapter, the detachable component being installed at a different height on the stroller frame in the first and second mount configuration.

4. The child stroller apparatus according to claim 1, wherein the third coupling portion of the support body is similar to the first coupling portion of the stroller frame in structure.

5. The child stroller apparatus according to claim 1, wherein the second coupling portion of the support body has a receiving slot adapted to receive the insertion of the first coupling portion of the stroller frame.

6. The child stroller apparatus according to claim 1, wherein the support body further has an extending portion, the second and third coupling portions respectively protruding from two opposite sides of the extending portion.

7. The child stroller apparatus according to claim 6, wherein the extending portion is fixedly connected with the second and third coupling portions.

8. The child stroller apparatus according to claim 6, wherein when the adapter is installed on the stroller frame, the second coupling portion protrudes downward from the extending portion and engages with the first coupling portion of the stroller frame, the extending portion extends forward along a horizontal direction from the second coupling portion, and the third coupling portion protrudes upward from the extending portion.

9. The child stroller apparatus according to claim 1, wherein the adapter further includes a locking mechanism operable to lock the adapter to the first coupling portion of the stroller frame, the locking mechanism including a latch movably connected with the support body, the latch being movable relative to the support body to engage with or disengage from the first coupling portion of the stroller frame.

10. The child stroller apparatus according to claim 9, wherein the latch slides toward an inner side of the support body for engaging with the first coupling portion of the stroller frame, the inner side of the support body facing an interior of the stroller frame where a child can be placed.

11. The child stroller apparatus according to claim 9, wherein the first coupling portion of the stroller frame has a recess disposed adjacent to a side edge of the first coupling portion, and the latch has an engaging protrusion adapted to engage with the recess.

12. The child stroller apparatus according to claim 9, wherein the locking mechanism further includes a spring operable to urge the latch to move for engaging with the first coupling portion of the stroller frame.

13. The child stroller apparatus according to claim 9, wherein the locking mechanism includes an operating part connected with the latch, the operating part being exposed at an inner side of the support body and operable to cause unlocking of the latch.

14. The child stroller apparatus according to claim 13, wherein the operating part is fixedly connected with the latch.

15. The child stroller apparatus according to claim 13, wherein the latch slides toward the inner side of the support body for engaging with the first coupling portion of the stroller frame, and the operating part is operated to urge the latch to slide in an opposite direction for disengaging from the first coupling portion of the stroller frame.

16. The child stroller apparatus according to claim 9, wherein the second coupling portion of the support body has a receiving slot, when the adapter is installed on the connecting mount, the first coupling portion of the stroller frame is inserted into the receiving slot and the latch extends to two opposite sides of the first coupling portion.

17. The child stroller apparatus according to claim 16, wherein the latch has an engaging protrusion adapted to engage with the first coupling portion, and the locking mechanism further includes an operating part that is connected with the latch and is exposed at an inner side of the support body, the operating part being operable to cause unlocking of the latch, and a portion of the operating part and the engaging protrusion being respectively located at two opposite sides of the receiving slot.

18. The child stroller apparatus according to claim 1, wherein each of the first coupling portion of the stroller frame and the third coupling portion of the adapter is suitable to receive the installation of a child seat and a bassinet.

19. The child stroller apparatus according to claim 1, wherein the stroller frame includes a front leg frame and a handle frame pivotally connected with each other via a pivot joint structure, and the first coupling portion is disposed adjacent to the pivot joint structure.

20. The child stroller apparatus according to claim 19, wherein the pivot joint structure includes a first coupling part fixedly connected with the front leg frame, and a second coupling part that is fixedly connected with the handle frame and is pivotally connected with the first coupling part, the first coupling portion being pivotally connected with the second coupling part.

* * * * *